United States Patent [19]

Rees et al.

[11] 3,997,487

[45] Dec. 14, 1976

[54] THERMOPLASTIC ELASTOMER

[75] Inventors: Richard Watkin Rees; Hans-Georg Reinhardt, both of Wilmington, Del.

[73] Assignee: E. I. Du Pont de Nemours and Company, Wilmington, Del.

[22] Filed: Aug. 20, 1974

[21] Appl. No.: 498,978

Related U.S. Application Data

[63] Continuation-in-part of Ser. No. 405,805, Oct. 12, 1973, abandoned.

[52] U.S. Cl. .................. 260/27 BB; 260/33.6 AQ; 526/272; 526/317
[51] Int. Cl.² ..................... C08K 5/01; C08L 93/00
[58] Field of Search ........ 260/27 R, 33.6, 33.6 AQ, 260/27 BB, 78.4 D, 78.4 R; 117/38; 526/272, 317

[56] References Cited

UNITED STATES PATENTS

| | | | |
|---|---|---|---|
| 2,837,491 | 6/1958 | McKay | 260/27 R |
| 3,565,841 | 2/1971 | Tarney | 260/27 R |
| 3,644,248 | 2/1972 | Luijk et al. | 260/78.4 D |
| 3,882,194 | 5/1975 | Krebaum et al. | 260/78.4 D |
| 3,884,882 | 5/1975 | Caywood | 260/78.4 D |

OTHER PUBLICATIONS

Encyclopedia of Chem. Techn. (2nd ed.) (vol. 7) (Wiley) (N.Y.) (1968), p. 500.
Nordel, development products report No. 20 (du Pont) (May 1963), pp. 9–14.

*Primary Examiner*—Donald E. Czaja
*Assistant Examiner*—H. H. Fletcher

[57] ABSTRACT

A very useful thermoplastic elastomer can be made by reacting, at an elevated temperature, (A) a suitable alpha-olefin copolymer elastomer (e.g., a copolymer of ethylene, propylene and a suitable diene) having carboxylic acid groups, and (B) a rosin salt of a divalent or monovalent metal.

12 Claims, No Drawings

THERMOPLASTIC ELASTOMER

CROSS-REFERENCE TO RELATED APPLICATION

This is a continuation-in-part of U.S. Patent application Ser. No. 405,805, filed Oct. 12, 1973, now abandoned.

BACKGROUND OF THE INVENTION

This invention relates to thermoplastic elastomers and to processes for preparing such elastomers.

The industries which manufacture and use synthetic elastomers are in need of an improved thermoplastic elastomer. The term "thermoplastic elastomer" herein designates a polymeric material from which one can manufacture shaped articles by extrusion, injection molding and/or compression molding methods of the type known to be useful for thermoplastic polymers; and the resulting shaped articles have elastomeric properties although they have not been subjected to a curing or vulcanization procedure. What is needed is a thermoplastic elastomer which can be produced easily and economically, which has good tensile strength and elongation properties, which is easily extruded or molded even when no plasticizing oil is added, and which still has good tensile strength and elongation properties after adding plasticizing oil and carbon black.

SUMMARY OF THE INVENTION

The present invention provides a thermoplastic elastomer which is the product of reacting, at an elevated temperature, A. an alpha-olefin copolymer elastomer having carboxylic acid groups and containing interpolymerized units of ethylene, at least one $C_3$–$C_{20}$ alpha-mono-olefin and at least one non-conjugated diene, and B. a rosin salt of a divalent or monovalent metal.

The invention also provides a process for preparing a thermoplastic elastomer which comprises forming a mixture of components (A) and (B) as described in the previous paragraph, and causing said components to react with each other at an elevated temperature.

DESCRIPTION OF PREFERRED EMBODIMENTS

The alpha-olefin copolymer elastomer of component A contains interpolymerized units of (1) ethylene, (2) at least one $C_3$–$C_{20}$ alpha-mono-olefin and (3) at least one non-conjugated hydrocarbon diene, for example, a diene having 5–22 carbon atoms. In most applications, a $C_3$–$C_6$ alpha-mono-olefin is preferred as the second component; especially preferred is propylene. However, one may sometimes wish to use a monomer such as 1-butene, 1-pentene or 1-hexene in place of the propylene or in combination with it. Elastomeric copolymers of these three types of monomers can be prepared by methods known in the art; for example, they can be prepared in the general manner described in U.S. Pat. Nos. 3,000,866, 3,093,620, 3,093,621 and 3,151,173 (Column 3). The disclosures of these patents are incorporated herein by reference. In a typical method, the monomers are copolymerized in the presence of a coordination catalyst system such as diisobutyl aluminum chloride and vanadium oxytrichloride.

One will usually prefer to use a component a elastomer which contains, as interpolymerized units, about 36–72 percent by weight of ethylene, about 25–48 percent by weight of propylene and about 2–16 percent by weight of a diene selected from the group: 1,4-hexadiene, 5-ethylidene-2-norbornene and dicyclopentadiene. It will be understood, however, that these proportions are merely preferred; and that one can also use other proportions known to be useful in this general type of elastomeric copolymer. In one very useful elastomer, the diene component contains both 1,4-hexadiene and 2,5-norbornadiene; this elastomer is described in the Caywood patent referred to in Example 1 below (page 6 of U.S. Text). It is also usually preferred to select a component A elastomer which has a molecular weight of at least 30,000 (for example, as indicated by inherent viscosity).

The elastomer of component A has carboxylic acid groups. In certain preferred embodiments of the invention, these acid groups are present as side chain groups. The elastomer preferably contains about 0.5–5.0 percent by weight of a carboxyl-group-containing monomer which has been grafted onto the copolymer or copolymerized with the other monomers of the copolymer. The carboxyl groups of the elastomer can be provided by known methods; for example (a) by grafting a carboxyl-group-containing monomer onto the elastomer backbone, (b) by copolymerizing a carboxyl-group-containing monomer with the other monomers used in preparing the elastomeric copolymer described above, or (c) by converting other functional groups to carboxyl groups according to known procedures.

With reference to the prior paragraph, among the carboxyl-group-containing monomers which can be used in method (b) are 5-norbornene-2-carboxylic acid, 3-methyl-5-norbornene-2-carboxylic acid, 5-norbornene-2,3-dianhydride, acrylic acid, methacrylic acid, crotonic acid, pimaric acid, and undecanoic acid. The grafting of method (a) can be carried out by known methods, for example, in the manner taught by the Caywood patent (German O.S. No. 2,401,149) referred to in Example I below (the disclosure of which is incorporated herein by reference). A preferred way to carry out the grafting of method (a) involves intimately mixing maleic anhydride with the copolymer by means which will avoid an appreciable generation of free radicals, and which concurrently or subsequently heats the mixture to a temperature at which thermal addition occurs. In general, the reaction temperature is preferably at least about 225° C. to achieve a satisfactory rate of grafting, and less than about 350° C. to avoid significant polymer breakdown. The best reaction temperature to use will depend on the properties of the polymer being employed, as will be evident to those skilled in the art.

Mixing of the maleic anhydride and copolymer can be done by blending molten anhydride with the copolymer in an internal mixer or extruder, or by blending finely divided dry maleic anhydride with the copolymer on a well-ventilated rubber mill with concurrent or subsequent heating (such as in a hot press or mold). Temperatures necessary to achieve thermal grafting are sufficiently high to dehydrate maleic acid, forming maleic anhydride in situ. Thus, maleic acid can be compounded with the copolymer instead of maleic anhydride. The maleic anhydride can be substituted with groups that do not unduly interfere with the graft reaction.

Preferred copolymers of ethylene, propylene, and 1,4-hexadiene are resistant to free radical formation under high shear stress conditions and are readily premixed with the anhydride on conventional bulk processing equipment without gel formation. However, in selecting the pre-mixing conditions for copolymers derived from strained ring dienes such as ethylidene norbornene, high temperatures, e.g., above 90° C., should be selected to avoid appreciable gel formation. The mixture then is preferably heated at about 225°–350° C. until the grafting has been completed.

Component B of the reaction mixture used to form the present thermoplastic elastomer is preferably a rosin salt of a divalent metal. It is usually preferred that the divalent metal is zinc or calcium. However, one can select other metals from those listed in groups IA, IIA, IIB and IVA of the Periodic Table, as found on pages 394 and 395 of the Handbook of Chemistry and Physics, 38th Edition, published by the Chemical Rubber Publishing Company. As indicated in the Examples which follow, a preferred zinc rosin salt is available from Hercules Inc. as "Pexate 511"; and a preferred calcium rosin salt is available from Tenneco Chemicals Inc. as "Hifos 138".

The rosins which can be used to form the component B rosin salt include ordinary rosins and rosin derivatives containing the carboxylic acid groups known to be present in rosins. Useful rosins can be illustrated by those having a perhydrophenanthrene skeleton and at least one carboxylic group (e.g., abietic or pimaric acid); also the known hydrogenated and disproportionated derivatives of ordinary rosins.

The rosin salt can be prepared by any suitable known method, for example, by reacting an oxide or hydroxide of the metal desired in the rosin salt with the particular rosin selected. The rosin salt can, if desired, contain some unreacted rosin acid (abietic acid or the like); or it can contain some unreacted metal oxide or hydroxide. In some of the better embodiments of the invention, the rosin salt is the product of mixing and reacting about equivalent amounts of the rosin and the metal compound. Although the rosin salt is usually prepared before starting the mixing of the components used to form the present thermoplastic elastomer, it can also be formed in situ (after adding the rosin and metal oxide or hydroxide and elastomeric copolymer to the reaction zone).

In the majority of applications, one will prefer that the amount of the component (B) rosin salt reacted with the component (A) elastomer is about 10–50% based on the total weight of components (A) and (B). This usually gives the best combination of thermoplastic and elastomeric properties in the product. The improvement in thermoplastic properties tends to be at a minimum when using less than 10% of the rosin salt; and the desired elastomeric properties approach a minimum when using more than 50% of the rosin salt. However, one skilled in the art will have no difficulty in selecting other proportions which will result in a significant improvement in the elastomeric copolymer properties for a particular end use.

It is also a very useful embodiment of this invention to provide a thermoplastic elastomer in which a plasticizing oil and carbon black have been blended with the product obtained by reacting components (A) and (B). For this purpose, one can use any of the plasticizing oils and carbon blacks which are known to be useful for preparing compounded products (e.g., molding compositions) from alpha-olefin copolymer elastomers. While neither of these ingredients is essential, some of the most useful products of this invention are prepared by blending about 1–80 parts by weight of a plasticizing oil and about 1–120 parts by weight of carbon black with 100 parts by weight of the product obtained by reacting elastomer A with rosin salt B. The novel thermoplastic elastomer can also be blended with one or more other additives known to be useful in preparing compounded products from alpha-olefin copolymer elastomers, for example, antioxidants, fillers, reinforcing agents, coloring agents and the like.

In carrying out the process of this invention, one forms a mixture of components (A) and (B) and causes these components to react with each other in a suitable reaction zone at an elevated temperature (well above 22° C., preferably above 60° C.). A preferred embodiment of the process employs a reaction zone temperature of about 80°–190° C. The mixture in the reaction zone is preferably kept within this temperature range until the reaction between components (A) and (B) has gone substantially to completion. The two components can be reacted by mastication of the copolymer while in contact with the rosin salt. Mastication involves a mechanical working of the materials in which they are subjected to strong shearing forces so that the copolymer is heated and softened. This procedure can be carried out, for example, on a two roll rubber mill, a Banbury mixer, or a Baker-Perkins internal mixer with dispersion blades. The mixture can be heated by external means to insure a useful reaction temperature, or the heat of the mastication process can be relied upon to generate a suitable elevated temperature.

The novel thermoplastic elastomer has been defined above as the product of reacting components (A) and (B). Since the inventors have not yet been able to obtain an accurate determination of the structural formula of the reaction product, the above definition is the best one currently available.

The present invention enables one to obtain a thermoplastic elastomer which has a very desirable and useful combination of properties, and which can be used to manufacture a wide variety of molded elastomeric products. For example, one can easily and economically prepare a thermoplastic elastomer product according to the present process (1) which can readily be injection or compression molded or extruded into shaped articles (and can be re-molded) by substantially the same methods knonw to be useful for processing conventional non-elastomeric thermoplastic polymers; (2) which has the elastomeric properties wanted in many end uses (for example, good tensile strength and elongation values and low permanent set) even though the curing or vulcanization procedure used with conventional elastomers is omitted; (3) which has good extrusion and molding characteristics even when no plasticizing oil is added; and (4) which has good tensile strength and elongation values even after adding a considerable amount of plasticizing oil and carbon black.

EXAMPLE 1

This Example, and those that follow, illustrate the invention; all amounts are by weight unless otherwise indicated.

Maleic anhydride was grafted onto an alpha-olefin copolymer elastomer which contains an interpolymerized units, 61.4% of ethylene, 32% of propylene and 6.6% of 1,4-hexadiene. This copolymer has (a) a Mooney viscosity (ML-1+4/121° C.) of about 35; (b) about 0.5 gram mole of ethylenic unsaturation per kilogram of the copolymer; and (c) an inherent viscosity of about 2.0 as measured on a solution of 0.1 gram of the copolymer in 100 ml. of perchloroethylene at 30° C.

The grafting procedure used was that described in the German patent application published on July 18, 1974 as German O.S. No. 2,401,149, which is equivalent to U.S. Pat. application Ser. No. 322,360 filed Jan. 10, 1973 by ) S. W. Caywood (now U.S. Pat. No. 3,884,882. The extruded copolymer-maleic anhydride graft contained 2.1% of maleic anhydride (calibrated infrared method) which is within normal experimental variation of the 2.23% value obtained by Caywood. Thus, the resulting elastomeric copolymer has side chain carboxylic acid groups.

The maleic anhydride grafted copolymer (25 grams) was mixed for 5 minutes at 160° C. under nitrogen in a Brabender Plastograph with 25 gm. of a rosin salt of zinc. The particular rosin salt (resinate) used had a zinc content of 11.2%. This zinc resinate was obtained from Hercules Inc. under the name "Pexate 511"; is sold primarily for polymer adhesive applications. It is understood that this rosin salt is made from stabilized rosin (resin) acids; it has a 0 acid number and a softening point of 142° C. (Hercules Drop Method).

A 10 gm. sample of the resulting material was compression molded at 200° C. for 2 minutes in a 3 inches by 6 inches by 0.025 inches chase. The snappy brown thermoplastic elastomer film obtained could be remolded at 200° C. The film had the following properties at 25° C. The Shore A hardness test is shown in ASTM D-676; the other tests are shown in ASTM D-412.

| | | |
|---|---|---|
| $M_{100}$ (Modulus-100%) | 200 | psi |
| $M_{200}$ | 450 | psi |
| $M_{300}$ | 1000 | psi |
| $T_B$ (tensile strength) | 4750 | psi |
| $E_B$ (elong. at break) | 470 | % |
| Permanent Set (at break) | 3 | % |
| Hardness, Shore A | 55 | |

The thermoplastic elastomer obtained in Example 1 not only has good thermoplastic molding characteristics even though no plasticizing oil was added, but also has desirable elastomeric properties as shown above.

EXAMPLE 2

A thermoplastic elastomer having utility similar to that mentioned in Example 1 was prepared in the following manner. A mercaptoacetic acid-grafted copolymer was prepared as follows. A copolymer elastomer as described in Example 1 (150 gm.) was stirred at room temperature for 64 hours in a mixture of 2 liters of n-hexane and 0.5 liter of tetrahydrofurane (THF). Thereafter, the solution was heated to 60° C., and 26.1 cc. of mercaptoacetic acid and 2.5 gm. of azobisdimethylvaleronitrile were added. The mixture was kept at 60° C. with stirring, and after 3 hours another 1.25 gm. of azobisdimethylvaleronitrile were added. After 5 hours, another 1.5 gm. of azobisdimethylvaleronitrile were added and the mixture stirred for 9 hours at 60° C. The mixture was kept for 8 hours at room temperature and then heated to 60° C., and 2.0 gm. of azobisdimethylvaleronitrile were added. After 7 hours, 0.5 liter of THF and 0.5 liter of hexane were added with another 2.0 gm. azobisdimethylvaleronitrile. The mixture was then refluxed for 9 hours and cooled to room temperature. Acetone was added to the solution to precipitate the polymer. The polymer was twice redissolved in a mixture of THF and hexane and precipitated with acetone. It was washed with acetone and dried in a heated vacuum desiccator at 50° C. Infrared analysis of this polymer indicates the presence of 3.04 percent mercaptoacetic acid.

The mercaptoacetic acid grafted copolymer (30 gm.), which had been redissolved in hexane, was precipitated with methanol and dried. Ten grams of the rosin salt described in Example 1 were milled with the grafted copolymer on a rubber mill, starting at a roll temperature of 25° C. and gradually heating the mixture to 130° C.; a rubbery sheet of material was obtained. A translucent thermoplastic film was obtained by molding the material for 2 minutes at 225° C. The film had the following properties at 25° C.

| | |
|---|---|
| $M_{100}$ | 250 psi |
| $T_B$ | 2400 psi |
| $E_B$ | 480 % |
| Permanent Set | 3 % |

The product of Example 2 can easily be molded and extruded as a thermoplastic material even though no plasticizing oil was added.

EXAMPLE 3

A sample of maleic anhydride-grafted copolymer was prepared according to the procedure used in Example 1. The sample contained 2.2% maleic anhydride.

The grafted copolymer (40 gm.) was mixed with/3.5 gm. of a rosin salt of calcium on a rubber mill in the manner described in Example 2 to obtain a rubbery sheet of material. The rosin salt was obtained from Tenneco Chemicals Inc. under the name "Hifos 138". It is a limed wood rosin having an acid number of 58, a softening point of 138° C. (Ball and Ring Method), an ash value (as CaO) of 4.2%, and a Ca(OH)$_2$ limeadded value of 5.7% based on the weight of rosin used. A thermoplastic elastomer slab was made by molding the rubbery material from the mill for 2 minutes at 225° C. The molded slab had the following properties at 25° C. The compression set tests were conducted on pellets by method ASTM D-395.

| | |
|---|---|
| Hardness, Shore A | 66 |
| $M_{100}$ | 350 psi |
| $T_B$ | 3150 psi |
| $E_B$ | 490 % |
| Permanent Set | 9 % |
| Compression Set (22 hrs./70° C.) | 82 % |
| Compression Set after annealing 18 hrs. at 130° C. (22 hrs./70° C.) | 71 % |
| Yerzley Resilience (ASTM D-945) at | |
| 25° C. | 90 % |
| 100° C. | 78 % |
| Volume Swell (%) in Water (100° C./7 days) ASTM D-471 | 5.2 |

The thermoplastic elastomer obtained in Example 3 has utility similar to that of the products of Examples 1 and 2.

EXAMPLE 4

A sample of maleic anhydride-grafted copolymer was prepared as described in Example 1. The sample contained 2.4% of maleic anhydride.

The maleic anhydride-grafted copolymer (18.5 gm.), 14.8 gm. FEF carbon black (ASTM Type N-550), and 7.4 gm. of a paraffinic oil (plasticizing oil) commercially available from Sun Oil Company as "Sunpar 150" were mixed at 125° C. in a Brabender Plastograph. The oil is ASTM D-2226 Type 104B oil having a molecular weight of 530, a total aromatic content of 16.3%, and a Sayboldt Universal Viscosity of 508 at 38° C. and of 64.3 at 99° C.; its carbon atoms are 69% paraffinic, 27% naphthenic and 4% aromatic. After a homogeneous mixture was obtained, 9.25 gm. of the zinc resinate of Example 1 were added and the temperature raised to 175° C. The thermoplastic elastomer was removed from the Plastograph after a total mixing cycle of 8 minutes. A 0.041 inch thick slab (Hardness A70) was compression molded for 2 minutes at 220° C., and it could be remolded at the same temperature. It had the following properties at the test temperatures indicated.

|  | 25° C. | 60° C. | 80° C. | 100° C. |
|---|---|---|---|---|
| $M_{100}$ (psi) | 900 | 500 | 380 | 325 |
| $T_B$ (psi) | 3000 | 1760 | 1280 | 965 |
| $E_B$ (%) | 430 | 410 | 420 | 395 |
| Permanent Set (%) | 12 | — | — | — |

It will be noted that the thermoplastic elastomer obtained in Example 4 still has very useful tensile strength and elongation properties after adding a considerable proportion of plasticizing oil and carbon black.

We claim:
1. A thermoplastic elastomer which is the product of reacting, at an elevated temperature of about 80°–190° C.,
    A. an alpha-olefin copolymer elastomer having carboxylic acid groups and containing interpolymerized units of ethylene, at least one $C_3$–$C_{20}$ alpha-mono-oelfin and at least one nonconjugated diene, said copolymer containing about 0.5–5.0 percent by weight of a carboxyl-group-containing monomer which has been grafted onto the copolymer or copolymerized with the other monomers of the copolymer, and
    B. a rosin salt of a divalent or monovalent metal; the amount of component (B) reacted with component (A) being about 10–50 percent based on the total weight of components (A) and (B).
2. An elastomer according to claim 1 wherein component (B) is a rosin salt of a divalent metal, and said alpha-mono-olefin of component (A) is a $C_3$–$C_6$ alpha-mono-olefin.
3. An elastomer according to claim 2 wherein said divalent metal is selected from the group: zinc and calcium, and said copolymer has side chain carboxylic acid groups.
4. An elastomer according to claim 2 wherein component (A) has a molecular weight of at least 30,000.
5. An elastomer according to claim 4 wherein component (A) contains, as interpolymerized units, about 36–72 percent by weight of ethylene, about 25–48 percent by weight of propylene and about 2–16 percent by weight of a diene selected from the group: 1,4-hexadiene, 5-ethylidene-2-norbornene and dicyclopentadiene.
6. A process for preparing a thermoplastic elastomer which comprises forming a mixture of the following components and causing said components to react with each other at an elevated temperature of about 80°–190° C:
    A. an alpha-olefin copolymer elastomer having carboxylic acid groups and containing interpolymerized units of ethylene, at least one $C_3$–$C_{20}$ alpha-mono-olefin and at least one non-conjugated diene, said copolymer containing about 0.5–5.0 percent by weight of a carboxyl-group-containing monomer which has been grafted onto the copolymer or copolymerized with the other monomers of the copolymer, and
    B. a rosin salt of a divalent or monovalent metal; the amount of component (B) reacted with component (A) being about 10–50 percent based on the total weight of components (A) and (B).
7. A process according to claim 6 wherein component (B) is a rosin salt of a divalent metal, and said alpha-mono-olefin of component (A) is a $C_3$–$C_6$ alpha-mono-olefin.
8. A process according to claim 7 wherein said divalent metal is selected from the group: zinc and calcium, and said copolymer has side chain carboxylic acid groups.
9. A process according to claim 7 wherein the mixture is kept at about 80°–190° C. until the reaction between said components has gone substantially to completion.
10. A process according to claim 9 wherein component (A) has a molecular weight of at least 30,000.
11. A process according to claim 10 wherein component (A) contains, as interpolymerized units, about 36–72 percent by weight of ethylene, about 25–48 percent by weight of propylene and about 2–16 percent by weight of a diene selected from the group: 1,4-hexadiene, 5-ethylidene-2-norbornene and dicyclopentadiene.
12. A process according to claim 10 having a diene component containing both 1,4-hexadiene and 2,5-norbornadiene.

* * * * *